June 25, 1968 R. L. VAN HUIS 3,389,689
POULTRY FEEDER AND SUSPENDED UNIT SUPPORT
Filed Oct. 20, 1966 2 Sheets-Sheet 1
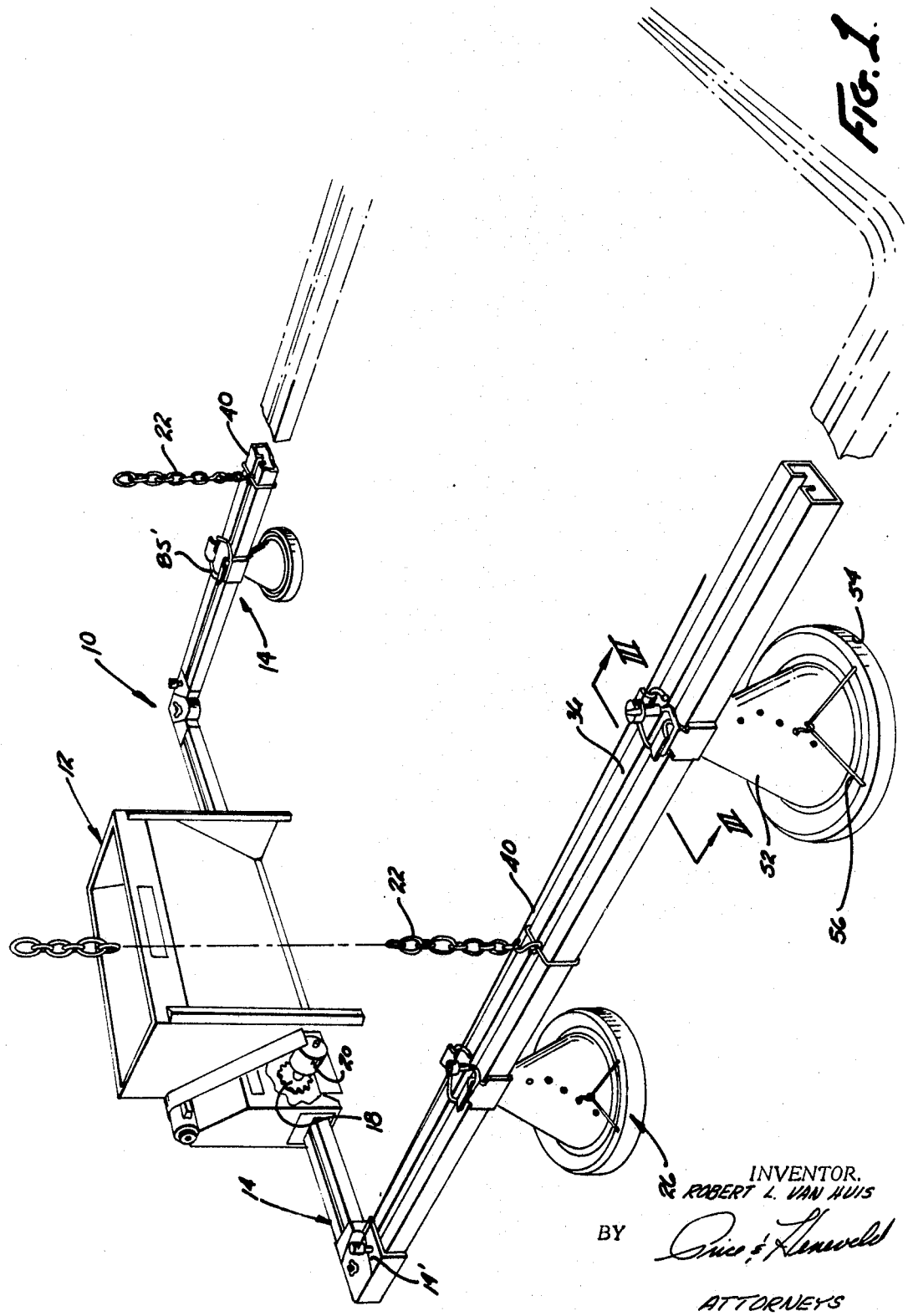
INVENTOR.
ROBERT L. VAN HUIS
BY
ATTORNEYS

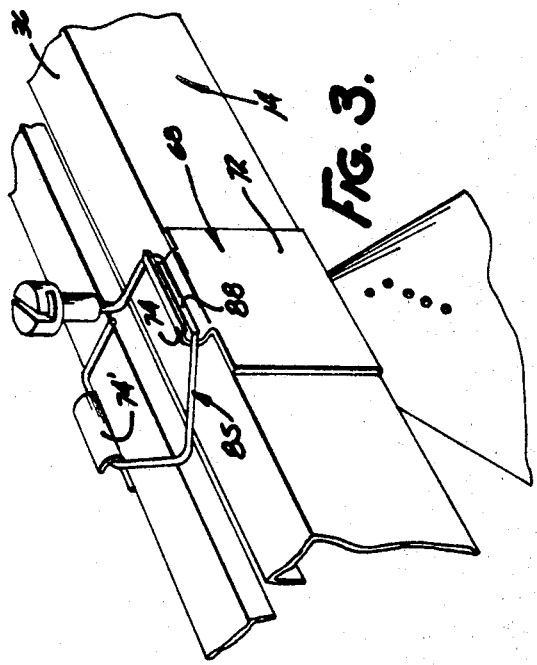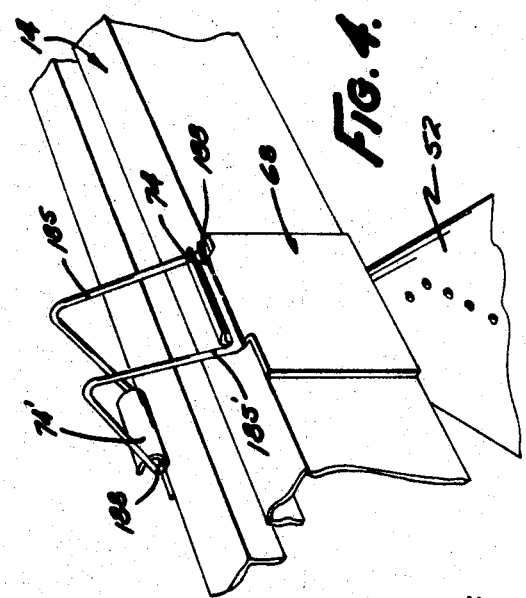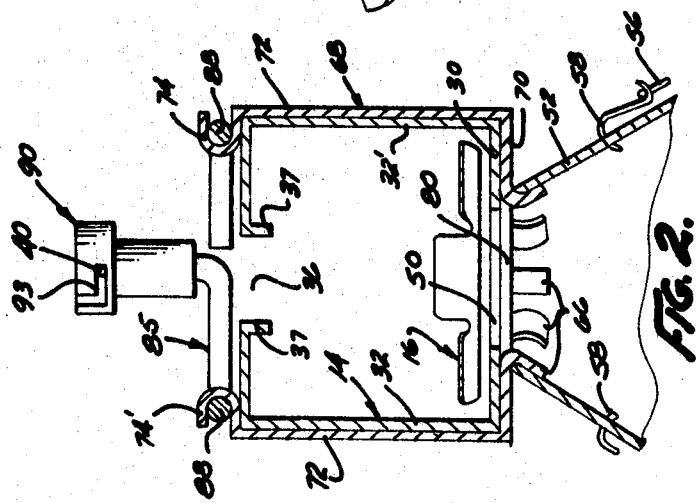

United States Patent Office 3,389,689
Patented June 25, 1968

1

3,389,689
POULTRY FEEDER AND SUSPENDED UNIT SUPPORT
Robert L. van Huis, Zeeland, Mich., assignor to Big Dutchman, Inc., Zeeland, Mich., a corporation of Michigan
Continuation-in-part of application Ser. No. 499,251, Oct. 21, 1965. This application Oct. 20, 1966, Ser. No. 597,188
13 Claims. (Cl. 119—52)

ABSTRACT OF THE DISCLOSURE

A suspended unit for poultry feeding comprising an elongated conduit having a narrow slot along the major portion of its length. The conduit has a feed advancing chain connected in recirculatory fashion with a suitable supply hopper passing therethrough. A plurality of feed units, communicating with the conduit via orifices in the bottom thereof, are suspended from the conduit by means of resilient clips. It is understood that this abstract is not to be utilized to limit the scope of this invention.

---

This invention relates to animal feeding apparatus, and more particularly to automatic poultry feeding equipment. This application is a continuation-in-part of copending application Ser. No. 499,251 filed Oct. 21, 1965, now abandoned, and assigned to the same assignee as the present invention.

Automated feeding of poultry in houses normally involves the employment of recirculating feed advancing means in a conduit. Two particular systems are frequently used, the first employing an open top, direct access trough type conduit having feed advanced therein by an endless means such as a chain or a coil, and the second having a closed conduit with a plurality of suspended feeding pans into which the feed is dropped from the conduit. The open top trough possesses several advantages, including its simplicity of construction and operation, and the facility for directly viewing the moving feed and chain to readily observe and rectify any trouble spots such as feed clogging. Sometimes it is desirable to employ the second type, however, so that the feed conduits can be elevated slightly above the heads of the poultry, with feed being dropped into the lower spaced feeding containers. This second type is normally much more complex in construction. It does not allow the operator to directly observe trouble areas in the conduit, nor does it allow him to easily rectify clogging problems and the like without at least partial disassembly.

It is a object of this invention to provide a pan and conduit type feeding system enabling direct visual observance of the feed advancing process inside the conduit to allow quick, simple, and exact locating of trouble spots and allowing easy rectification of these trouble areas such as feed clogging, without disassembly. Yet the poultry cannot have direct access to the conduit. The novel system, therefore, largely has the advantages of both the open trough and the suspended feeder type mechanisms without the major disadvantages thereof.

It is an object of this invention to provide a conduit and suspended pan feeding system of the type described embodying means for the positive prevention of birds feed-

2 ing from the conduit regardless of their physical position with respect thereto.

Another object of this invention is to provide a conduit and suspended pan feeding system that is simpler and easier to assemble. Each of the pan-type units can be secured stably to the conduit and by merely snapping them into position with a minimum of effort, without employing bolts, screws or the like, and using a simple tool such as a screwdriver.

These and other objects of this invention will become apparent upon studying the following specification in conjunction with the drawings, in which:

FIG. 1 is a perspective view of the novel feeding system;

FIG. 2 is a sectional view taken on plane II—II of FIG. 1;

FIG. 3 is a perspective enlarged view of the upper portion of one of the pan-type units illustrated in FIG. 1 showing one type of snap connection;

FIG. 4 is a perspective view similar to FIG. 3, showing a modified type snap connector;

FIG. 5 is an exploded perspective view illustrating yet another type of snap connector; and FIG. 6 is a schematic illustration of the insulator rotation function.

Referring now specifically to the drawings, the system 10 illustrated includes a feed supply hopper means 12 positioned inside the animal housing, and which may in turn, be supplied feed from an external source outside the house. Cooperative with this feed supply hopper is a conduit 14 which extends from the housing through a circuitous path and returns to the housing. An endless, recirculatory, feed advancing means such as chain 16 (FIG. 2) extends throughout conduit 14, and through the base of hopper 12 for picking up feed and advancing it through the conduit in conventional fashion. The chain may be advanced by a sprocket 18 driven by an electrical motor 20 which is controllably operated.

The conduit 14 is preferably suspended from overhead supports by a plurality of suspension elements 22 which may be chains, cables, or other equivalent. If desired, hopper means 12 may also be suspended from overhead supports as in U.S. Patent 3,124,104, or may alternatively be mounted on the floor. Suitable additional sprockets are mounted on each of the corner units 14'. These corner units may be of the type having a removable cover as shown in U.S. Patent No. 3,147,853. The chain may be of the type shown in U.S. Patent No. 2,737,823 or the equivalent thereto. Instead of the chain, a continuous helical coil or other like conventional feed advancing means may be employed.

The conduit 14 itself is preferably of a generally rectangular cross-sectional configuration as illustrated in FIG. 2, normally being formed by bending or rolling the sheet into a bottom, sides, and top. Specifically, it includes a bottom 30 which integrally merges with upstanding parallel side walls 32 and 32', which extend vertically, and then bend toward each other in flanges to form a slotted top surface 34. These flanges terminate short of each other to leave a narrow viewing slot 36 between the downwardly turned flanges 37 thereof. This viewing slot is only a fraction of the width of the top portion of the conduit itself, i.e., preferably less than about one-third of the width. It has sufficient width to allow insertion of tools into the conduit for unplugging etc., but is sufficiently narrow to largely prevent insertion of the head of a fowl. The narrowness of the slot therefore substantially prevents direct access by the fowl to food contained and advanced in the conduit. Yet, it allows direct viewing of the conditions inside the conduit to enable the operator to readily spot any trouble areas such as feed clogging conditions, and direct access for rectifying the situation.

The relative narrowness of slot 36 is supplemented by the downwardly turned flanges insofar as discouraging direct feeding from the trough. The presence of these flanges renders the successful angle of attack near vertical for the bird. Otherwise, the beak will merely strike the flange 37 opposite from the side of the trough upon which the bird is standing. Even if the bird is successful in getting its beak into the food within the trough, most of the food will be scraped away when the bird raises its head by the downward edge of the opposite flange 37, thus preventing spillage.

Slot 36, additionally, provides an axial access along the length of conduit 14 wherethrough the chain 16 may be inserted during installation or replacement procedure (see FIG. 2). This is accomplished by merely tilting the chain in a near vertical plane and dropping the lower edge through slot 36. Sufficient clearance is provided for the upper edge of the chain to clear the depending lips 37 on the interior of slot 36 and rotate to its horizontal working position subsequent to such insertion. Such installation is also facilitated by the removable corner covering members on the corner units which, as illustrated in the foregoing noted patent, may be removed by merely loosening a single wingnut.

The advantages of such installation are readily apparent. It is not necessary to thread a cable or the like through the conduit and thereafter pull the feed chain therethrough. Rather, as outlined above, it is merely necessary to tilt the chain and insert it directly into working position within the conduit through slot 36. This must be accomplished, of course, prior to installation of the feed pans.

In order to further discourage attempts by birds o obtain direct access to the feed through slot 36, an electrical shock wire extends along the length of the conduit. It is supported at the corner units and above each of the feed access units 26 by means of suitable insulating supports to be discussed hereinafter. Wire 40 is preferably positioned directly above viewing slot 36 and vertically spaced therefrom an approximate distance of between one and two and one-half inches. This vertical spacing should be such that: (1) birds will not be allowed to entangle their legs between the wire and the opposite side of the conduit as they attempt to roost thereon and hang themselves; (2) when a bird attempts to roost on the wire, it will sag sufficiently to allow the birds foot to touch the metallic conduit and thus complete the shocking circuit; and (3) birds standing on the floor or on the feeder pans attempting to eat from the slot will complete the circuit by touching the top or back of their heads or necks against the wire and bringing the opposite sides of their heads (or another part of their body, if, for example, they are standing on the feeder pan) into contact with the conduit system.

Once the wire touches the conduit, the charge thereon will bleed directly to ground and, during the touching interval, no shocking will occur along the entire length of the wire. The vertical alignment of the wire 40 with viewing slot 36 tends to prevent this from happening as a bird attempts to roost on the wire since the wire sags directly into the viewing slot 36 and does not touch the metallic housing. Thus, even if the instantaneous weight of the bird is sufficiently great to depress the wire 40 below the plane of upper conduit section 34, the shock will still be delivered and the bird will quickly remove himself from the roosting position.

Ordinarily, the conduit will be supported sufficiently high above the floor or ground that the birds will be unable to reach into the slot while standing on the floor. This elevation is prompted by the desirability of positioning the feed pan at approximately the shoulder level of the birds being fed. Despite this desirability, however, such factors as lack of time, bird growth, and the like often frustrate the maintenance of optimal feeding conditions and the conduit viewing slot 36 can be reached by the birds while standing on the ground. In this case, the relatively small vertical spacing of the wire above the conduit causes the chicken's head or other body member to complete the shock circuit between the wire and the conduit. The central positioning of the wire, of course, insures this result regardless of the side of the conduit on which the bird is standing.

Even if the conduit is at the proper height for the birds being fed, the presence of the feed pan, to be discussed in more detail hereinafter, allows some birds to reach the viewing slot by standing thereon. Such standing, of course, is highly undesirable because of bird excretions, food spillage and the like. In this particular case, the shock wire and conduit relative spacing function in a manner identical to that when the bird is standing on the floor and the resulting shock will cause the bird to quickly retreat from the pan and back to the floor.

Hence, the advantages of a conduit and suspended pan system are achieved while still enabling direct viewing and access to the conduit for trouble shooting, but without allowing feeding access.

Conduit 14 has at spaced intervals along its length a plurality direct access feed units 26. The conduit has a plurality of feed dropping outlet openings or orifices 50 (FIG. 3) in its bottom 30 for feed to be dropped into the receiving pan units. Each of these pan units includes a generally conical guide and support 52, with the pan 54 being suspended therebeneath by V-shaped inverted bails 56. Each pair of bails has its lower ends hooked into the pan, and is secured to the upper end portion of the conical support by S-shaped hooks 58 (FIG. 3) on the upper ends of the bails. Each of the feeding pan units, and specifically each of conical portions 52 is suspended from the trough by the novel fastener means shown in FIGS. 1, 3 and 5, or alternatively, by the modified assembly shown in FIG. 4.

More specifically, a collar-type, peripherally extending sheet metal bracket 68, configurated to match the configuration of the trough, suspends the cone and is attached to the conduit by a tensile snap connector 85. The collar has a bottom portion 70 and upstanding wall portions 72 and 72'. These wall portions have their upper terminal end portions bent to form flanges that extend toward each other over the opposite outer top edge portions of the conduits. The flanges are curled upwardly and outwardly at their inner ends to form oppositely opening retention grooved hooks 74 and 74'. Bottom 70 of this element has an opening 80 formed into it by severing and deforming downwardly and outwardly extending tabs into the opening in the top of conical portion 52 and against the inner wall thereof to secure these elements together. This deforming and connecting operation is normally done during manufacture of the assembly. The connection of each of the suspended units to the conduit itself with the snap connector is normally achieved during assembly at the place of usage. This is done by temporarily resiliently spreading collar bracket legs 72 and 72' (away from each other to snap them around the conduit, and then) resiliently spreading legs 88 and 88' of tensile member 85 away from each other against the inherent bias of the element and snapping them into the grooves formed by hooks 74 and 74'. This resilient spring-type element may be a heavy duty, spring wire loop of generally hexagonal configuration as shown in the upper left-hand corner of FIG. 1 or it may assume the configuration shown in FIG. 5. The connection may be achieved very simply merely by placing one leg in one of the flanges, and then stretching it with a screwdriver or a pair of pliers on the other leg to snap it into position. Its tension characteristic draws the bracket together securely over the conduit to maintain a tight, rigid connection, but one which is easily removable when desired.

Preferably, the snap-on connector 85 has one of its terminal portions bent vertically to form an upstanding projection or member 89 adapted to rotatably receive insulator 90. Insulator 90 comprises a cap-bolt shape plastic member having a pair of offset slots 91 and 92 a different levels in its elevation. Slot 91 is sufficiently deep to communicate with slot 92 whereby, as shown in FIG. 6, the entire insulator may be rotated after the wire has been inserted in slot 91 to bring it into alignment with slot 92. It will be retained, thereafter, by the overhanging portion 93 of the insulator.

The provision of insulators 90 affixed directly to the connectors 85 has the advantage of insuring sufficient vertical support for the shock wire to prevent it from sagging and grounding out too easily. If, for example, the installer must attach a separate support mechnism to the conduit it is likely that he will not attach a sufficient number of them to insure proper operation of the system.

Instead of the spring clip element illustrated in FIG. 5, the modified connector 185 illustrated in FIG. 4 may be employed. This assembly includes the same generally conical portion 52 connected to the collar bracket 68 in the same fashion. The modified spring connector 185 has legs 188 and 188' which fit within the flanges 74 and 74' in a similar manner to that just described. Instead of the spring unit being planar, however, it has a generally peaked configuration with its spread bight portion 185' being above the assembly.

Those familiar with this field of technology will probably foresee additional advantages not specifically recited herein. It is also conceivable that certain minor deviations in construction may be employed without departing from the concept presented. Hence, the invention is intended to be limited only by the scope of the appended claims and the reasonable equivalents to those defined therein.

I claim:

1. In a poultry feeding apparatus having hopper supply means, conduit means extending from said hopper means and returning thereto, and recirculatory feed advancing means in said conduit and cooperative with said hopper means; said conduit having a plurality of feed exit orifices at spaced intervals therealong; a plurality of feed receiving units suspended from said conduit beneath said orifices, each including a support and a pan suspended therebeneath, the improvement comprising a bracket attached to said support and having spaced connector portions extending up on opposite sides of said conduit and terminating in terminal portions engaging said conduit in supporting relation and having outwardly oppositely flared upper portions and removable, resilient, deformable snap connector means engaged beneath said flared portions, and extending across the top of said conduit maintaining the terminal portions in contact with the conduit.

2. In a poultry feeding apparatus having hopper supply means, conduit means extending from said hopper and returning thereto, and recirculatory feed advancing means in said conduit and cooperative with said hopper means; said conduit having a plurality of feed exit orifices at spaced intervals therealong; a plurality of feed receiving units suspended from said conduit beneath said orifices, the improvement comprising each of said units having resilient means extending up on opposite sides of said conduit, said resilient means having terminal portions engaging said conduit in supporting relation, and removable, resilient snap-on connector means maintaining said terminal portions in said relation.

3. The apparatus as set forth in claim 1 wherein said snap connector is a resilient, generally stiff heavy wire loop having spaced legs.

4. The apparatus as set forth in claim 3 wherein said connector has an upstanding member integrally affixed thereto adapted to rotatably receive an insulator.

5. The apparatus as set forth in claim 1 wherein said snap connector means is a resilient tensile spring element.

6. In poultry feeding apparatus having hopper supply means, conduit means extending from said hopper means and returning thereto, and recirculatory feed advancing means in said conduit and cooperative with said hopper means; said conduit having a bottom and side walls which extend upwardly from said bottom and then toward each other to form a top surface excluding direct poultry access to feed therein, but terminating short of each other to leave a narrow viewing slot along its length for trouble spotting by an operator; means supporting an electrical shock wire extending along said conduit adjacent said slot and spaced vertically therefrom such that fowl standing below said conduit and attempting to feed from said slot, will contact said wire; said conduit having a plurality of bottom feed exit orifices at spaced intervals therealong; a plurality of feed receiving units suspended from said conduit beneath said orifices, each of said units having bracket means extending up around said conduit and terminating in spaced connector portions, and tensioned, deformable, resilient connector means between said portions.

7. The apparatus as set forth in claim 6 wherein said supporting means comprises insulating means associated with each of said connector means for supporting said wire.

8. The apparatus as set forth in claim 6 wherein said wire is positioned in vertical registration with said slot.

9. In poultry feeding apparatus having hopper supply means, conduit means extending from said hopper means and returning thereto, and recirculatory feed advancing means in said conduit and cooperative with said hopper means; said conduit having a bottom and side walls which extend upwardly from said bottom and then toward each other to form a top surface excluding direct poultry access to feed therein, but terminating short of each other to leave a narrow viewing slot along its length for trouble spotting by an operator; an electrical shock wire extending along said conduit adjacent said slot to discourage attempts of fowl to feed directly therefrom; said conduit having a plurality of bottom feed exit orifices at spaced intervals therealong; a plurality of feed receiving units suspended from said conduit beneath said orifices, each of said units having bracket means extending up around said conduit and terminating in spaced connector portions, and tensioned, deformable, resilient connector means between said portions; said bracket means comprising a collar type bracket attached to said support and having spaced connector portions extending up on opposite sides of said conduit and terminating in outwardly oppositely flared hook portions, and said resilient connector means being unitary, heavy, closed loop, spring wire having two parallel legs engaged in said hook portions, and the remainder extending across the top of said conduit.

10. In a poultry feeding apparatus having hopper supply means with an exit end and an entrance end, conduit means extending from the exit end of said hopper means and returning to said entrance end, recirculatory feed advancing means including an endless chain in said conduit means, said feed advacing means extending through said hopper means, said conduit means having a plurality of feed exit orifices at spaced intervals therealong, with a plurality of feed receiving units suspended from said conduit means beneath said orifices; and said conduit means having a bottom and sidewalls which extend upwardly from said bottom and then turn toward each other to form a top surface excluding direct poultry access to feed therein, but terminating short of each other to provide a narrow slot along its length, having a width of a small fraction of the conduit means width, with sufficient width to enable trouble spotting by an operator, but sufficiently narrow to discourage attempts at direct feeding from said conduit means by fowl, the relative dimensions of said conduit means and said feed advancing means being such that said advancing means may be inserted into said conduit means through said narrow slot and thereafter rotated to its working position relative thereto.

11. The apparatus as set forth in claim 10 wherein said walls terminate in flange portions extending downwardly into the interior of said conduit.

12. The apparatus as set forth in claim 10 which further comprises means supporting an electrical shock wire extending along said conduit adjacent said slot and vertically spaced therefrom.

13. The apparatus as set forth in claim 12 wherein said wire is positioned in vertical registration with said slot.

References Cited

UNITED STATES PATENTS

| | | | |
|---|---|---|---|
| 2,681,639 | 6/1954 | Littlefield | 119—57 |
| 2,715,887 | 8/1955 | Flannery et al. | 119—52 |
| 2,940,424 | 6/1960 | Rose et al. | 119—53 |
| 3,033,163 | 5/1962 | Hostetler et al. | 119—52 |

HUGH R. CHAMBLEE, *Primary Examiner.*

UNITED STATES PATENT OFFICE
CERTIFICATE OF CORRECTION

Patent No. 3,389,689                           June 25, 1968

Robert L. van Huis

It is certified that error appears in the above identified patent and that said Letters Patent are hereby corrected as shown below:

In the heading to the printed specification, lines 4, 5 and 6, "assignor to Big Dutchman, Inc., Zeeland, Mich., a corporation of Michigan" should read -- assignor, by mesne assignments, to U. S. Industries, Inc., New York, N. Y., a corporation of Delaware --. Column 3, line 41, "o" should read -- to --. Column 4, line 53, "duits" should read -- duit --. Column 5, line 10, "a different" should read -- at different --.

Signed and sealed this 25th day of November 1969.

(SEAL)
Attest:

Edward M. Fletcher, Jr.                      WILLIAM E. SCHUYLER, JR.
Attesting Officer                                  Commissioner of Patents